United States Patent
Bickham et al.

(10) Patent No.: US 7,272,289 B2
(45) Date of Patent: Sep. 18, 2007

(54) LOW BEND LOSS OPTICAL FIBER

(75) Inventors: Scott R. Bickham, Corning, NY (US); Snigdharaj K. Mishra, Wilmington, NC (US); Steven S. Rosenblum, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 187 days.

(21) Appl. No.: 11/241,280

(22) Filed: Sep. 30, 2005

(65) Prior Publication Data

US 2007/0077016 A1 Apr. 5, 2007

(51) Int. Cl.
G02B 6/036 (2006.01)
(52) U.S. Cl. .................. 385/128; 385/100; 385/114
(58) Field of Classification Search ............. 385/128
See application file for complete search history.

(56) References Cited

U.S. PATENT DOCUMENTS

| 4,691,990 | A | 9/1987 | Cohen et al. | 350/96.33 |
| 4,691,991 | A | 9/1987 | Unger | 350/96.33 |
| 4,838,643 | A | 6/1989 | Hodges et al. | 350/96.33 |
| 5,032,001 | A | 7/1991 | Shang | 350/96.33 |
| 5,278,931 | A | 1/1994 | Antos et al. | 385/126 |
| 5,608,832 | A * | 3/1997 | Pfandl et al. | 385/112 |
| 6,091,873 | A | 7/2000 | Matsuo et al. | 385/123 |
| 6,229,946 | B1 | 5/2001 | Sasaoka et al. | 385/123 |
| 6,343,176 | B1 | 1/2002 | Li et al. | 385/127 |
| 6,404,967 | B2 | 6/2002 | Arai et al. | 385/126 |
| 6,459,837 | B1 * | 10/2002 | Fitz et al. | 385/113 |
| 6,477,297 | B1 * | 11/2002 | DeMeritt et al. | 385/32 |
| 6,483,975 | B1 | 11/2002 | Hsu et al. | 385/123 |
| 6,516,125 | B1 * | 2/2003 | Park et al. | 385/127 |
| 6,522,819 | B2 | 2/2003 | Shimotakahara et al. | 385/123 |
| 6,563,996 | B1 | 5/2003 | Winningham | 385/128 |
| 6,584,263 | B2 | 6/2003 | Fewkes et al. | 385/128 |
| 6,611,647 | B2 | 8/2003 | Berkey et al. | 385/123 |
| 6,694,079 | B1 | 2/2004 | Matsuo et al. | 385/123 |

(Continued)

FOREIGN PATENT DOCUMENTS

WO 2001/27667 4/2001

(Continued)

OTHER PUBLICATIONS

Unger et al., "Investigation of the Microbending Sensitivity of Fibers", Journal of Lightwave Technology, vol. 12, No. 4, Apr. 1994, pp. 591-596.

Primary Examiner—Michelle Connelly-Cushwa
(74) Attorney, Agent, or Firm—Joseph M. Homa; Svetlana Short

(57) ABSTRACT

An optical fiber having both low macrobend loss and low microbend loss. The fiber has a MAC number less than 7.0 and a zero dispersion wavelength less than 1450 nm. The optical fiber advantageously comprises a primary coating and a secondary coating. The primary coating has a Young's modulus of less than 1.0 MPa and a glass transition temperature of less than −25° C. The secondary coating surrounds the primary coating, and the secondary coating has a Young's modulus of greater than 1200 MPa. The macrobend loss as measured by a 20 mm diameter bend test at 1550 nm is not more than 5.0 dB/m. Optical fiber ribbon and optical fiber cable that include the optical fiber is also disclosed.

20 Claims, 5 Drawing Sheets

U.S. PATENT DOCUMENTS

| | | |
|---|---|---|
| 6,754,421 B2 | 6/2004 | Shimotakahara et al. ... 385/123 |
| 6,760,527 B2 * | 7/2004 | Berkey et al. ............. 385/123 |
| 6,771,865 B2 | 8/2004 | Blaszyk et al. ............ 385/127 |
| 6,775,451 B1 | 8/2004 | Botelho et al. ............ 385/128 |
| 6,795,628 B2 | 9/2004 | Shibuta ..................... 385/123 |
| 6,801,699 B1 * | 10/2004 | Bickham et al. ........... 385/123 |
| 6,856,744 B2 | 2/2005 | Kumano ..................... 385/127 |
| 6,869,981 B2 | 3/2005 | Fewkes et al. ............... 522/33 |
| 6,895,140 B2 | 5/2005 | Matsuo et al. ............... 385/23 |
| 6,901,196 B2 | 5/2005 | Takahashi et al. .......... 385/124 |
| 6,904,215 B2 | 6/2005 | Christoff et al. ........... 385/124 |
| 6,928,211 B2 | 8/2005 | Tanigawa et al. ............ 385/24 |
| 2001/0017967 A1 | 8/2001 | Hirano et al. ............... 385/123 |
| 2002/0097970 A1 | 7/2002 | Sasaoka ...................... 385/123 |
| 2003/0210877 A1 * | 11/2003 | Berkey et al. .............. 385/123 |
| 2003/0223716 A1 * | 12/2003 | Christoff et al. ........... 385/124 |
| 2004/0218882 A1 | 11/2004 | Bickham et al. ........... 385/127 |
| 2005/0213902 A1 | 9/2005 | Parsons ...................... 385/102 |
| 2006/0165355 A1 * | 7/2006 | Greenwood et al. ........ 385/100 |

FOREIGN PATENT DOCUMENTS

| | | |
|---|---|---|
| WO | WO 02/048767 | 6/2002 |
| WO | WO 03/091781 | 11/2003 |

* cited by examiner

LOW BEND LOSS OPTICAL FIBER

BACKGROUND OF THE INVENTION

1. Field of the Invention

The present invention relates to optical fibers having low bend losses.

2. Technical Background

A long standing need exists for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

Optical fiber is typically cabled such that an optical fiber or a bundle of optical fibers is surrounded by a buffer tube and/or matrix material. For example, a co-planar bundle of optical fibers can be encapsulated into a ribbon cable matrix. Optical fiber may be disposed in loose tubes, and the loose tubes in loose-tube cable can be unfilled or filled with a buffer material such as gel. Optical fiber may instead be tightly buffered by encasing the fiber in a plastic layers, such as a soft plastic layer surrounded by a hard plastic layer. Other cabling is known.

The MAC number of an optical fiber, as used herein, is defined as the mode field diameter at 1310 nm, in microns, divided by the fiber cut-off (according to the 2 meter test), in microns. See, for example, Unger and WO 01/27667. It is known that optical fibers having lower MAC numbers will generally exhibit lower macrobend losses.

Increasingly, coarse wavelength division multiplexing (CWDM) systems and applications operate in the 1310 nm window, the S-band, C-band, and/or L-band. Low bend losses are desirable in optical systems with various bending environments imposed upon optical fiber such as found in access and FTTx optical network deployments, particularly in each of the 1310 nm window and S-, C-, and L-bands.

SUMMARY OF THE INVENTION

Disclosed herein is an optical waveguide fiber comprising a core region having a refractive index profile, an outermost annular cladding region surrounding the core region, a primary coating contacting and surrounding the outer annular cladding region, the primary coating having a Young's modulus of less than 1.0 MPa and a glass transition temperature of less than −25° C., and a secondary coating surrounding the primary coating, the secondary coating having a Young's modulus of greater than 1200 MPa. The refractive index profile of the fiber is selected to provide a MAC number of not more than 7.0, a zero dispersion wavelength of less than 1450 nm, and a 20 mm diameter bend loss at 1550 nm of not more than 5.0 dB/m.

Preferably, the primary coating is a cured product of a primary curable composition including an oligomer and at least one monomer. In preferred embodiments, the total oligomer content of the primary curable composition is between about 40 wt % and about 60 wt %. In preferred embodiments, the total monomer content of the primary curable composition is between about 35 wt % and about 55 wt %.

Preferably, the 20 mm diameter bend loss at 1550 nm is not more than 2.0 dB/m.

In some preferred embodiments, the refractive index profile is selected to further provide a 2-m fiber cutoff of less than 1400 nm. In other preferred embodiments, the refractive index profile is selected to further provide a 2-m fiber cutoff of less than 1330 nm.

In some preferred embodiments, the refractive index profile is selected to further provide a zero dispersion wavelength of less than 1325 nm. In other preferred embodiments, the refractive index profile is selected to further provide a zero dispersion wavelength of between 1300 and 1325 nm.

Preferably, the refractive index profile is selected to further provide a cabled cutoff of less than 1260 nm.

In some preferred embodiments, the refractive index profile is selected to further provide a mode field diameter at 1310 nm of less than 9.0 µm. In other preferred embodiments, the refractive index profile is selected to further provide a mode field diameter at 1310 nm of between 8.2 and 9.0 µm. In still other preferred embodiments, the refractive index profile is selected to further provide a mode field diameter at 1310 nm of not more than 8.6 µm.

In some preferred embodiments, the refractive index profile is selected to further provide a MAC number of between 6.2 and 7.0. In other preferred embodiments, the refractive index profile is selected to further provide a MAC number of not more than 6.8.

In some preferred embodiments, the relative refractive index profile of the core relative to the outermost annular cladding region is non-negative, preferably entirely non-negative. In other preferred embodiments, the relative refractive index profile of the core relative to the outermost annular cladding region has at least one segment which is negative.

Preferably, the optical fiber has a maximum hydrogen induced attenuation change of less than 0.03 dB/km at 1383 nm after being subjected to 0.01 atm partial pressure hydrogen for at least 144 hours. Preferably, the optical fiber has an optical attenuation at 1383 nm which is not more than 0.10 dB/km above an optical attenuation at 1310 nm, and even more preferably the optical attenuation at 1383 nm is less than the optical attenuation at 1310 nm.

In some preferred embodiments, the 20 mm diameter bend loss at 1550 nm is not more than 1.0 dB/m. In other preferred embodiments, the 20 mm diameter bend loss at 1550 nm is not more than 0.5 dB/m.

Also disclosed herein is an optical fiber ribbon comprising the optical fiber, as well as an optical fiber cable comprising the optical fiber.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a multiple window fiber which can accommodate operation in at least the 1310 nm window and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
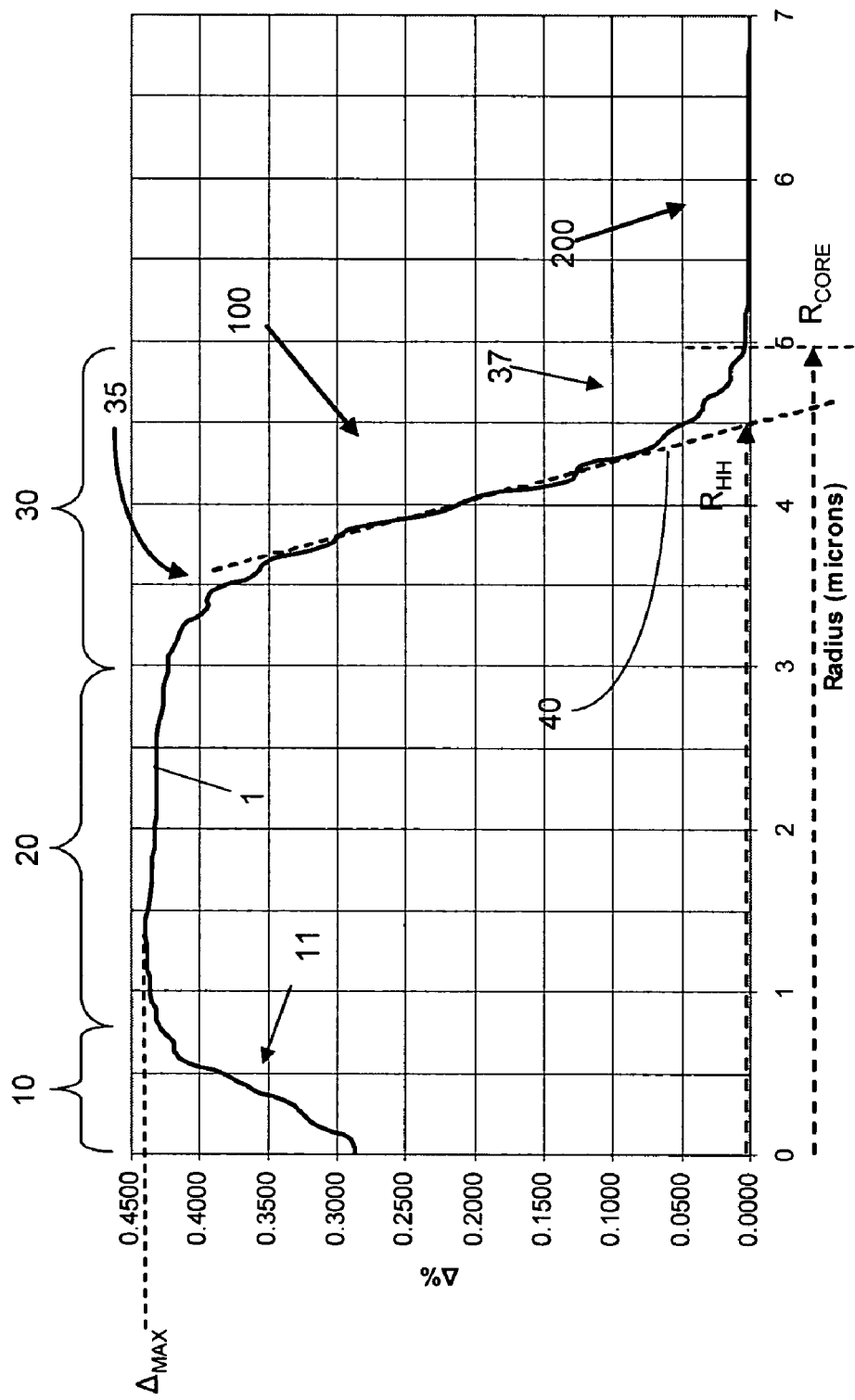
FIGS. 1-3 show refractive index profiles corresponding to a first set of preferred embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index. In cases where the refractive index of a region is greater than the average refractive index of the cladding region, the relative index percent is positive and the region can be said to be raised or to have a positive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r \, dr)^2 / (\int f^4 r \, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_0$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 r \, dr/\int [df/dr]^2 r \, dr)$, the integral limits being 0 to ∞.

The bend performance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment.

The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein has a MAC number of not more than 7.0 and a zero dispersion wavelength of less than 1450 nm in order to provide desirable macrobend performance and dispersion characteristics. Various preferred embodiments are disclosed herein.

Figure 2:
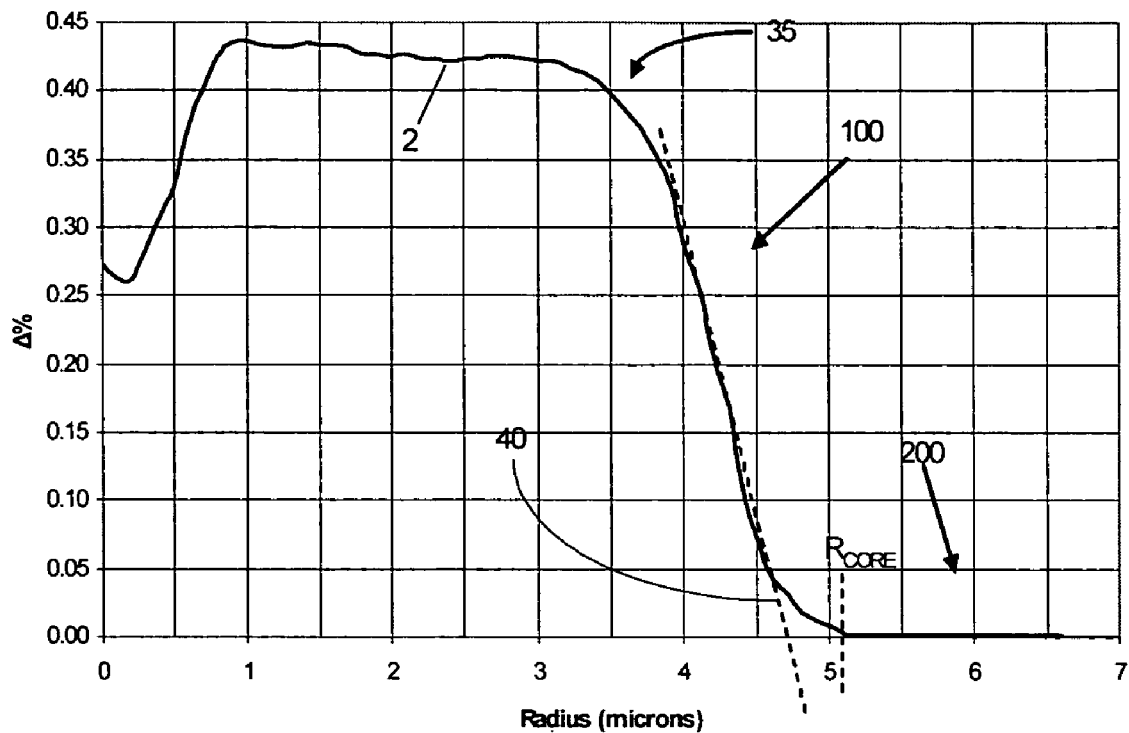
Figure 3:
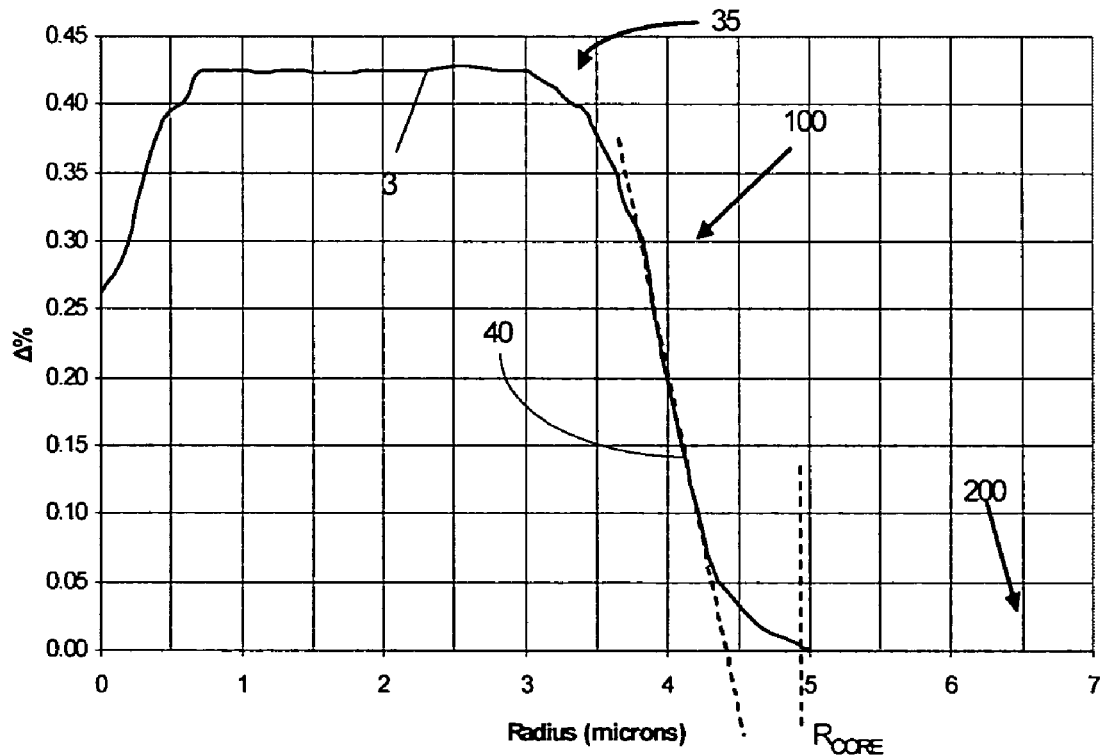

Table 1 lists an illustrative first set of preferred embodiments of optical fiber, Examples 1 through 3. FIGS. 1-3 show the corresponding refractive index profiles of Examples 1-3 in curves 1-3, respectively.

TABLE 1

| | | Example: | | |
|---|---|---|---|---|
| | | Ex 1 | Ex 2 | Ex 3 |
| Zero Dispersion Wavelength | nm | 1307 | 1301 | 1309 |
| Dispersion at 1310 nm | ps/nm-km | 0.21 | 0.81 | 0.07 |
| Dispersion at 1550 nm | ps/nm-km | 16.7 | 17.5 | 16.6 |
| Dispersion at 1625 nm | ps/nm-km | 20.8 | 21.6 | 20.7 |
| Dispersion Slope at 1310 nm | ps/nm²-km | 0.082 | 0.087 | 0.085 |
| Dispersion Slope at 1550 nm | ps/nm²-km | 0.057 | 0.057 | 0.057 |
| Kappa at 1550 nm | nm | 293 | 307 | 291 |
| MFD1550 | μm | 9.39 | 9.56 | 9.43 |
| Attenuation at 1550 nm | dB/km | 0.195 | 0.195 | 0.195 |
| Pin Array at 1550 nm | dB | 0.8 | 0.6 | 1.1 |
| Lateral Load at 1550 nm | dB/m | 0.10 | 0.11 | 0.10 |
| LP11 cutoff (theoretical) | nm | 1397 | 1451 | 1381 |
| LP02 cutoff (theoretical) | nm | 888 | 915 | 873 |
| Cabled cutoff | nm | 1240 | 1230 | 1200 |
| $A_{eff}$ at 1310 nm | μm² | 55.3 | 58.7 | 55.7 |
| $A_{eff}$ at 1550 nm | μm² | 68.0 | 71.1 | 68.5 |
| $\Delta(r = 0)$ | % | 0.29 | 0.27 | 0.26 |
| $\Delta(r = 0.8)$ | % | 0.43 | 0.43 | 0.43 |
| $\Delta(r = 1)$ | % | 0.44 | 0.44 | 0.42 |
| $\Delta_{MAX}$ | % | 0.44 | 0.44 | 0.43 |
| $r_{\Delta MAX}$ ($=r_{\Delta 1MAX}$) | μm | 1.0 | 0.9 | 1.3 |
| $\Delta(r = 1.5\ \mu m)$ | % | 0.44 | 0.43 | 0.42 |
| $\Delta(r = 2\ \mu m)$ | % | 0.43 | 0.43 | 0.43 |
| $\Delta(r = 2.5\ \mu m)$ | % | 0.43 | 0.42 | 0.43 |
| $\Delta(r = 3\ \mu m)$ | % | 0.42 | 0.42 | 0.43 |
| $\Delta(r = 3.5\ \mu m)$ | % | 0.38 | 0.40 | 0.38 |
| $\Delta(r = 4\ \mu m)$ | % | 0.20 | 0.29 | 0.19 |
| $\Delta(r = 4.5\ \mu m)$ | % | 0.04 | 0.07 | 0.03 |
| $\Delta(r = 5\ \mu m)$ | % | 0.00 | 0.01 | 0.00 |
| $\Delta(r = 5.5\ \mu m)$ | % | 0.00 | 0.00 | 0.00 |
| $\Delta(r = 6\ \mu m)$ | % | 0.00 | 0.00 | 0.00 |
| $R_{CORE}$ | μm | 4.9 | 5.1 | 4.9 |

Table 2 lists measured macrobend mandrel wrap bend losses, mode field diameter at 1310 nm, and 2 meter fiber cutoff values for Examples 1-3, as well as the calculated MAC number (MFD@1310 nm in microns divided by fiber cutoff in nm multiplied by 1000).

TABLE 2

| | | Example: | | |
|---|---|---|---|---|
| | | 1 | 2 | 3 |
| 20 mm diameter Macrobend @ 1550 nm | dB/m | 0.20 | 0.45 | 0.90 |
| MFD @ 1310 nm | μm | 8.40 | 8.53 | 8.44 |
| Fiber Cutoff (2 meter method) | nm | 1343 | 1332 | 1303 |
| MAC number | — | 6.25 | 6.40 | 6.48 |

Table 3 lists measured macrobend mandrel wrap bend losses, mode field diameter at 1310 nm, 2 meter fiber cutoff, cabled cutoff values, as well as the calculated MAC number (MFD@1310 nm in microns divided by fiber cutoff in microns, for optical fiber Examples 1A and 1B which had refractive index profiles similar to Examples 1-3.

TABLE 3

| | | Example: | |
|---|---|---|---|
| | | 1A | 1B |
| MFD @ 1310 nm | μm | 8.63 | 8.80 |
| Fiber Cutoff (2 meter method) | nm | 1310 | 1307 |
| MAC number | — | 6.59 | 6.73 |

TABLE 3-continued

|  |  | Example: | |
|---|---|---|---|
|  |  | 1A | 1B |
| Cable cutoff | nm | 1244 | 1223 |
| 14 mm diameter macrobend @1550 nm | dB/m | 21.4 | 46.3 |
| 20 mm diameter macrobend @1550 nm | dB/m | 0.76 | 2.6 |
| 25 mm diameter macrobend @1550 nm | dB/m | 0.09 | 0.26 |
| 30 mm diameter macrobend @1550 nm | dB/m | 0.01 | 0.02 |
| 14 mm diameter macrobend @1625 nm | dB/m | 46.3 | 95.2 |
| 20 mm diameter macrobend @1625 nm | dB/m | 2.8 | 8.6 |
| 25 mm diameter macrobend @1625 nm | dB/m | 0.24 | 1.2 |
| 30 mm diameter macrobend @1625 nm | dB/m | 0.1 | 0.14 |

The optical fibers illustrated by Examples 1-3 and 1A-1B have an optical mode effective area at 1550 nm which is greater than about 60 µm², preferably between 60 and 90 µm², even more preferably between about 65 and 85 µm². In some preferred embodiments, the optical mode effective area at 1550 nm is between about 65 and 75 µm².

As illustrated in FIG. 1, the core comprises a central region 10 extending from the centerline (r=0) to a radius of 0.8 µm, an intermediate region 20 extending from a radius of 0.8 µm to 3 µm, and an outer region 30 extending from a radius of 3 µm to the outer limit of the core, $R_{CORE}$. The core 100 ends and the cladding 200 begins at $R_{CORE}$. The relative refractive index profile of the core 100 $\Delta(r)$, comprises the respective relative refractive indexes of the central 10, intermediate 20, and outer 30 core regions, $\Delta_1(r)$, $\Delta_2(r)$, $\Delta_3(r)$, respectively. The core 100 preferably has a positive refractive index throughout. The core 100 comprises a maximum relative refractive index $\Delta_{MAX}$ occurring between r=0 and r=3 µm. $\Delta_{MAX}$ is greater than 0.40%. In some preferred embodiments, $\Delta_{MAX}$ is greater than 0.42%, and in other preferred embodiments, $\Delta_{MAX}$ is greater than 0.43%. Preferably, $\Delta_{MAX}$ is greater than 0.40% and less than 0.50%.

The central region 10 may comprise a relative refractive index profile having a so-called centerline dip 11, as seen in FIG. 1, which may occur as a result of one or more optical fiber manufacturing techniques. However, the centerline dip 11 in any of the refractive index profiles disclosed herein is not necessary, so that, for example, $\Delta 1(r)$ is substantially constant across the entire intermediate region.

The intermediate region 20 has a substantially constant relative refractive index profile, i.e. the difference between the relative refractive index at any two radii within the intermediate region is less than 0.02%, and in some preferred embodiments less than 0.01%. The absolute magnitude of the difference between $\Delta_2(r=2$ µm$)$ and $\Delta_2(r=3$ µm$)$ is not greater than 0.01%. Thus, the relative refractive index profile of the intermediate region 20 has a substantially flat shape. Everywhere in the intermediate region 20, $\Delta_2(r)$ is greater than 0.40%, and in some embodiments greater than 0.42%.

At least a part of the outer region 30 of the core 100 comprises a relative refractive index $\Delta_3(r)$ having an alpha (α) shape extending from a radius of 3 µm to 4 µm, and preferably α is between 7 and 11, even more preferably between 8 and 10. A tangent line drawn tangent to the relative refractive index $\Delta(r)$ at a radius corresponding to half the height of $\Delta_{MAX}$ for the core 100 intersects the $\Delta=0\%$ axis at a radius $R_{HH}$. Preferably, $R_{HH}$ is greater than 4.50 µm to provide lower bend loss. In preferred embodiments, $R_{HH}$ is greater than 4.50 µm and less than 5.0 µm. The outer region may further comprise a tail portion having an alpha (α) shape of α<1.0. The radial extent of the tail portion 37 (ending at a radius of $R_{CORE}$ defined herein where $\Delta(r)$ is less than 0.01%) can depend upon the manufacturing process used to fabricate the fiber. In preferred embodiments, $R_{CORE}$ is less than 8.0 µm, preferably less than 6.0 µm. $R_{CORE}$ is preferably between 4.50 µm and 8.0 µm, more preferably between 4.50 µm and 6.0 µm.

In one set of preferred embodiments, $\Delta(r)$ is greater than 0.40% and less than 0.5% for all radii from 0.8 µm to 3.0 µm, $\Delta(r)$ is greater than 0.30% and less than 0.45% at a radius of 3.5 µm, $\Delta(r)$ is greater than 0.10% and less than 0.40% at a radius of 4.0 µm, and $\Delta(r)$ is greater than 0.02% and less than 0.10% at a radius of 4.5 µm.

In another set of preferred embodiments, $\Delta(r)$ is greater than 0.40% and less than 0.45% for all radii from 0.8 µm to 3.0 µm, $\Delta(r)$ is greater than 0.35% and less than 0.43% at a radius of 3.5 µm, $\Delta(r)$ is greater than 0.15% and less than 0.35% at a radius of 4.0 µm, and $\Delta(r)$ is greater than 0.02% and less than 0.10% at a radius of 4.5 µm.

Additional preferred embodiments of optical fiber disclosed herein, which are set forth in FIGS. 4-7 and the corresponding calculated values in Table 4, and which also provide low MAC number and excellent bend performance.

TABLE 4

|  |  | Example | | | |
|---|---|---|---|---|---|
|  |  | 4 | 5 | 6 | 7 |
| Dispersion at 1550 nm | ps/nm/km | 16.5 | 16.7 | 16.8 | 17.4 |
| Dispersion Slope at 1550 nm | ps/nm²/km | 0.059 | 0.059 | 0.058 | 0.059 |
| Kappa at 1550 nm | nm | 282 | 285 | 288 | 296 |
| $A_{eff}$ at 1550 nm | µm² | 72.2 | 71.9 | 72.2 | 72.3 |
| MFD1550 | µm | 9.75 | 9.73 | 9.74 | 9.70 |
| Attenuation at 1550 nm | dB/km | 0.192 | 0.191 | 0.191 | 0.192 |
| Lateral Load at 1550 nm | dB/m | 0.13 | 0.11 | 0.11 | 0.10 |
| Pin Array at 1550 nm | dB | 1.9 | 1.5 | 1.6 | 1.5 |
| Dispersion at 1310 nm | ps/nm/km | −0.4 | −0.3 | −0.2 | 0.4 |
| Dispersion Slope at 1310 nm | ps/nm²/km | 0.087 | 0.088 | 0.088 | 0.088 |
| MFD1310 | µm | 8.60 | 8.60 | 8.62 | 8.64 |
| Zero Dispersion Wavelength | nm | 1315 | 1314 | 1312 | 1306 |
| LP11 cutoff (theoretical) | nm | 1382 | 1394 | 1392 | 1366 |
| LP02 cutoff (theoretical) | nm | 915 | 942 | 931 | 846 |
| Cabled Cutoff | nm | 1185 | 1200 | 1200 | 1215 |
| Fiber Cutoff (2 m Cutoff) | nm | 1285 | 1295 | 1295 | 1300 |

TABLE 4-continued

| | | Example | | | |
|---|---|---|---|---|---|
| | | 4 | 5 | 6 | 7 |
| MAC # | | — | 6.7 | 6.6 | 6.7 | 6.6 |

Figure 4:
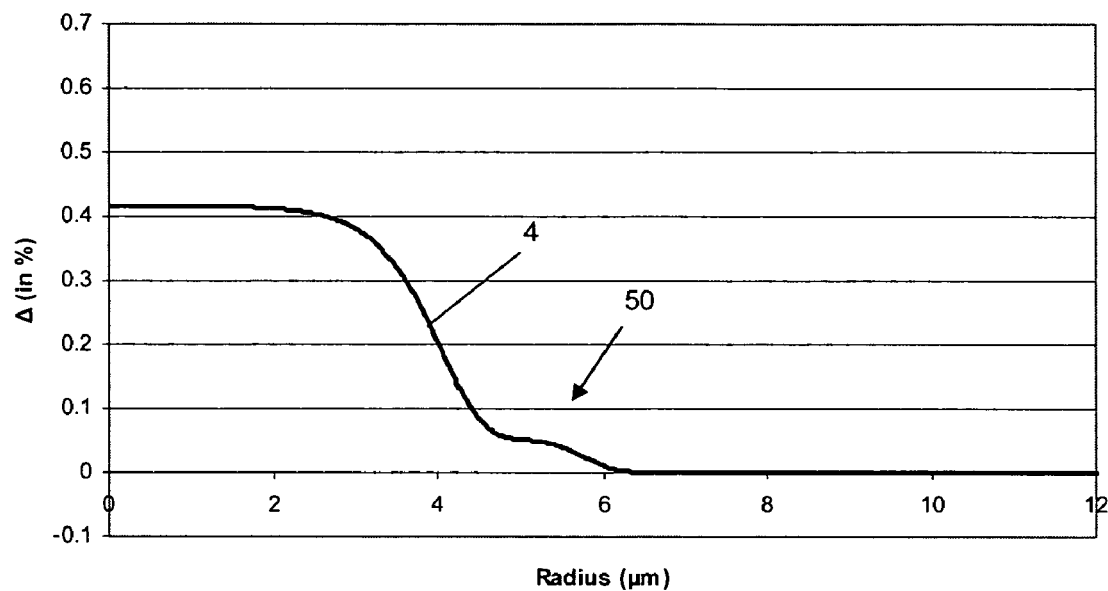
FIG. 4 shows a refractive index profile corresponding to a second set of preferred embodiments of an optical waveguide fiber as disclosed herein.

Example 4 of Table 4 is illustrative of a second set of preferred embodiments having a "pedestal" 50 in the refractive index profile, preferably having a Δ not more than 0.1%, and a width of not more than 6 μm, which provides a lower cutoff (2-meter cutoff and cable cutoff). FIG. 4 shows the corresponding refractive index profile of Example 4 in curve 4.

Figure 5:
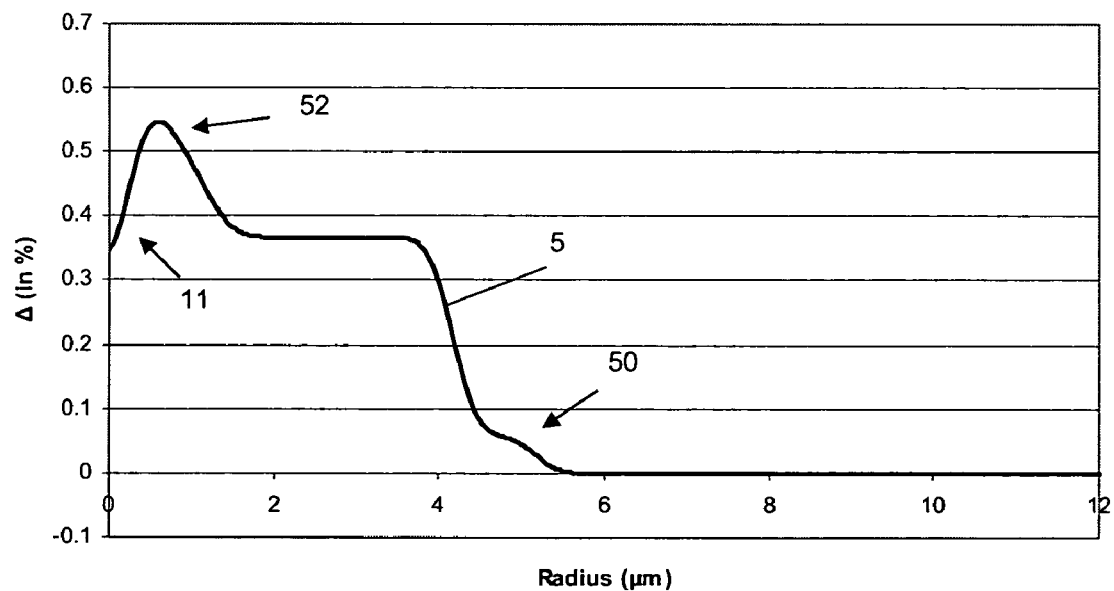
FIG. 5 shows a refractive index profile corresponding to a third set of preferred embodiments of an optical waveguide fiber as disclosed herein.

Example 5 of Table 4 is illustrative of a third set of preferred embodiments having a centerline dip 11 and having a local peak with a maximum relative refractive index between 0 and 2 μm, preferably between 0 and 1 μm, with a Δ value of between 0.50% and 0.60%, and a substantially constant Δ value of between 0.30% and 0.40%, preferably between 0.35% and 0.40% for radii from 2 to 3 μm, preferably for radii from 2 to 3.5 μm. The profile may also have a pedestal 50, preferably having a Δ not more than 0.1% and a width of not more than 6 μm. FIG. 5 shows the corresponding refractive index profile of Example 5 in curve 5. Table 5 lists measured macrobend mandrel wrap bend losses, mode field diameter at 1310 nm, 2 meter fiber cutoff, cabled cutoff values, as well as the calculated MAC number (MFD@1310 nm in microns divided by fiber cutoff in nm multiplied by 1000), for optical fiber Examples 5A-5B which had refractive index profiles similar to Example 5.

TABLE 5

| | | Example: | |
|---|---|---|---|
| | | 5A | 5B |
| MFD @ 1310 nm | μm | 8.71 | 8.54 |
| Fiber Cutoff (2 meter method) | nm | 1328 | 1277 |
| MAC number | — | 6.56 | 6.69 |
| Cable cutoff | nm | 1254 | 1188 |
| 14 mm diameter macrobend @1550 nm | dB/m | 22.0 | 42.0 |
| 20 mm diameter macrobend @1550 nm | dB/m | 0.75 | 2.2 |
| 25 mm diameter macrobend @1550 nm | dB/m | 0.04 | 0.12 |
| 30 mm diameter macrobend @1550 nm | dB/m | 0.01 | 0.015 |
| 14 mm diameter macrobend @1625 nm | dB/m | 49.7 | 84.6 |
| 20 mm diameter macrobend @1625 nm | dB/m | 2.6 | 7.5 |
| 25 mm diameter macrobend @1625 nm | dB/m | 0.17 | 0.62 |
| 30 mm diameter macrobend @1625 nm | dB/m | 0.05 | 0.09 |

Figure 6:
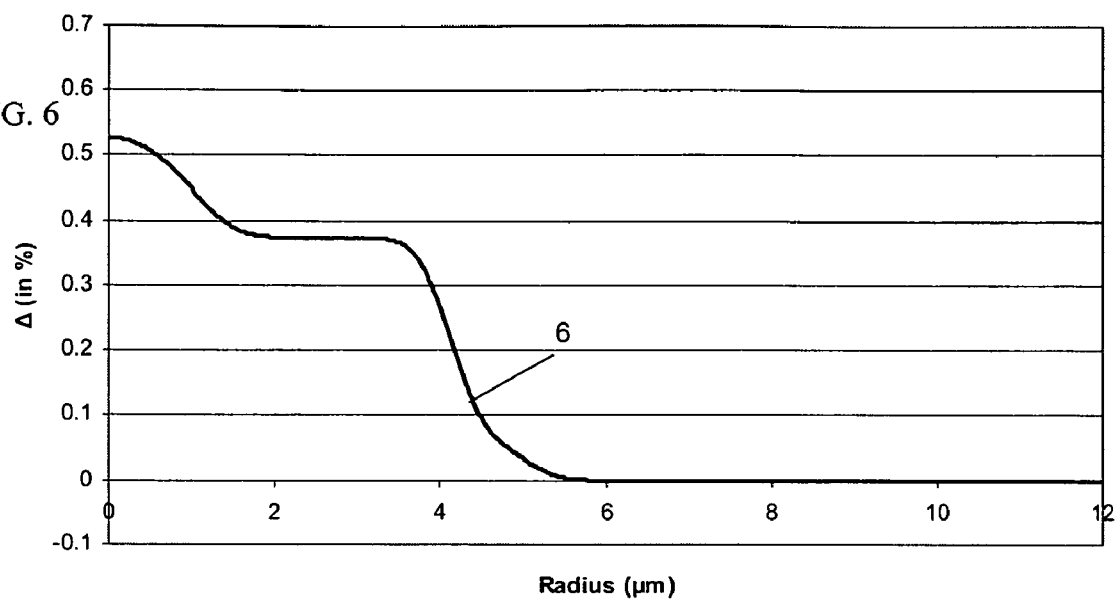
FIG. 6 shows a refractive index profile corresponding to a fourth set of preferred embodiments of an optical waveguide fiber as disclosed herein.

Example 6 of Table 4 is illustrative of a fourth set of preferred embodiments having no centerline dip and having a local peak 52 with a maximum relative refractive index occurring between 0 and 2 μm, preferably between 0 and 1 μm, with a Δ value of between 0.50% and 0.60%, and a substantially constant Δ value of between 0.30% and 0.40%, preferably between 0.35% and 0.40% for radii from 2 to 3 μm, preferably for radii from 2 to 3.5 μm. The profile may also have a pedestal 50, preferably having a Δ not more than 0.1% and a width of not more than 6 μm. FIG. 6 shows the corresponding refractive index profile of Example 6 in curve 6.

Figure 7:
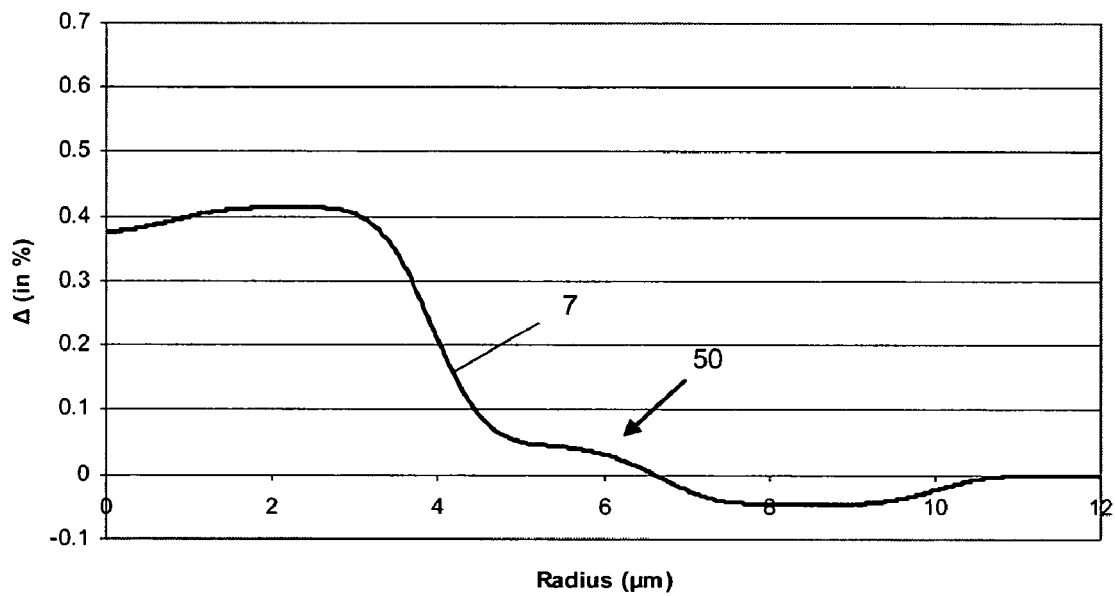
FIG. 7 shows a refractive index profile corresponding to a fifth set of preferred embodiments of an optical waveguide fiber as disclosed herein.

Example 7 of Table 4 is illustrative of a fifth set of preferred embodiments. FIG. 7 shows the corresponding refractive index profile of Example 7 in curve 7 as having a profile similar to the embodiment shown in FIG. 1 but also having a "pedestal" 50 with a Δ value of between 0.02% and 0.07% for radii from 5 to 6 μm, contactingly surrounded by a depressed region with a Δ value of between 0% and −0.1% for radii from 7 to 9 μm. The depressed region may span radii from 6 to 14 μm.

For the fibers disclosed herein, in preferred embodiments the 20 mm macrobend loss at 1550 rum is less than 5.0 dB/m, preferably less than 2.0 dB/m, more preferably less than 1.0 dB/m, and still preferably less than 0.50 dB/m. Fiber cutoff (2 m method) is less than 1450 nm, preferably less than 1400 nm, more preferably less than 1350 nm, even more preferably less than 1330 nm. In some preferred embodiments, the 2 m fiber cutoff is between 1290 nm and 1350 nm. The mode field diameter at 1310 nm is less than 8.8 μm, more preferably less than 8.7 μm. In preferred embodiments, the mode field diameter at 1310 nm is between 8.2 and 8.6 μm.

In preferred embodiments, the optical fibers disclosed herein comprise: kappa at 1550 nm of 270 to 330 nm; zero dispersion less than 1340 nm, more preferably less than 1325 nm, even more preferably between 1270 and 1325 nm; a dispersion at 1310 nm having a magnitude less than 3 ps/nm-km, more preferably less than 1 ps/nm-km; and a dispersion slope at 1310 nm of less than 0.10 ps/nm$^2$–km. Pin array macrobend loss at 1550 nm is less than 5.0 dB, preferably less than 2.0 dB, more preferably less than 1.0 dB.

Attenuation (spectral) at 1550 nm is preferably less than 0.24 dB/km, more preferably less than 0.23 dB/km, even more preferably less than 0.21 dB/km.

Thus, the optical fibers of the present invention provide good bending performance, and additionally provide cutoff wavelengths suitable for single mode operation at wavelengths greater than about 1260 nm.

In some embodiments, the core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core and a cladding layer (or cladding or outermost annular cladding region) surrounding and directly adjacent the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative refractive index profile, more preferably a positive refractive index profile, wherein the core is surrounded by and directly adjacent to a cladding layer.

Preferably, the refractive index profile of the optical fiber disclosed herein is non-negative from the centerline to the outer radius of the core, $R_{CORE}$. In preferred embodiments, the optical fiber contains no index-decreasing dopants in the core.

Preferably, the optical fiber disclosed herein is capable of transmitting optical signals in the 1260 rum to 1625 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 8:
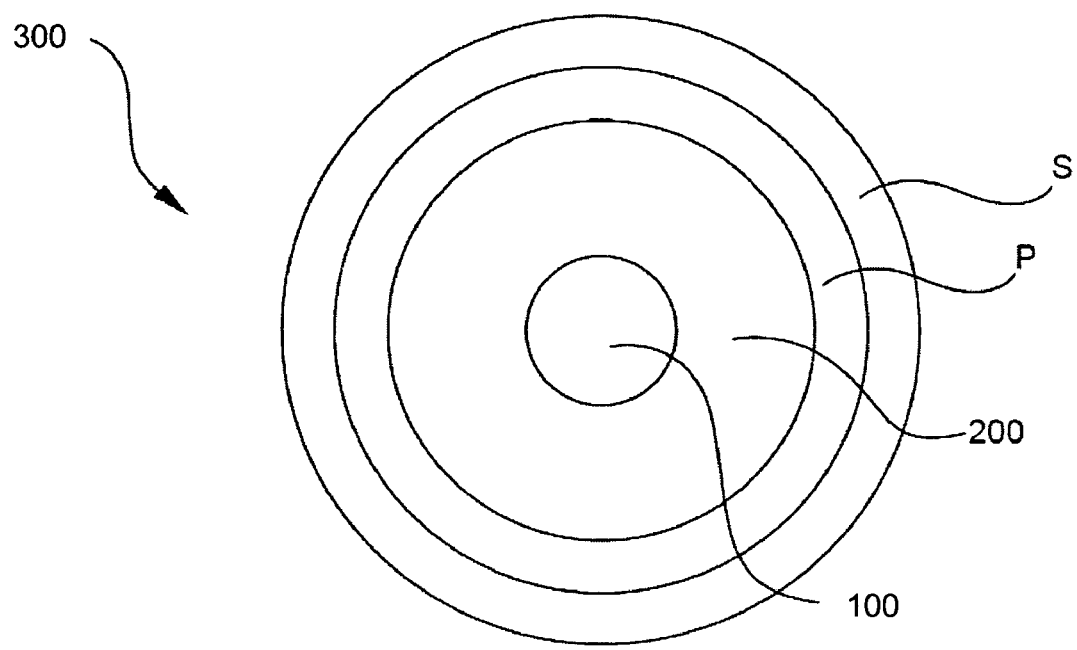
FIG. 8 is a simplified schematic cross-sectional view of a preferred embodiment of an optical waveguide fiber as disclosed herein.

FIG. 8 is a schematic representation (not to scale) of an optical waveguide fiber 300 as disclosed herein having core 100 and an outer annular cladding or outer cladding layer or clad layer 200 directly adjacent and surrounding the core 100.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

Preferably, the optical fiber disclosed herein has a silica-based core and cladding. In preferred embodiments, the cladding has an outer diameter, 2* Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber. In preferred embodiments, the outer diameter of the coating is about 250 μm.

Figure 9:
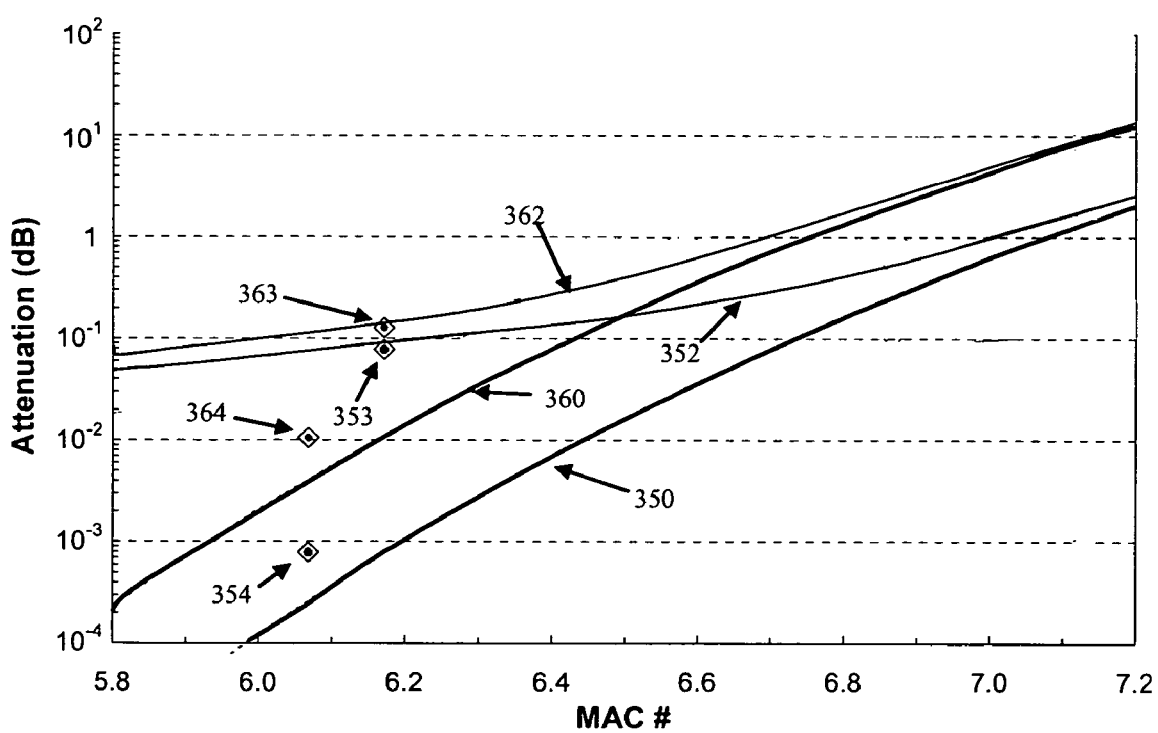
FIG. 9 is a schematic illustration of attenuation vs. MAC number for optical fiber disclosed herein disposed in a polypropylene tube at −40° C. at 1550 nm and 1625 nm.

For fibers having a MAC number less than 7.0 and a zero dispersion less than 1450 nm, we have found that, when deployed in a buffer tube, although macrobend losses in the fiber are smaller for fibers with lower MAC number, the microbend losses do not decrease with decreasing MAC number as rapidly as macrobend losses decrease with MAC number. That is, the optical fiber exhibits higher microbend losses, relative to macrobend losses, at lower MAC numbers when the fiber is deployed in a buffer tube. FIG. 9 illustrates the calculated macrobend losses at 1550 nm (line 350) and at 1625 nm (line 360), as well as macrobend plus microbend losses at 1550 nm (line 352) and at 1625 nm (line 362), for an optical fiber having a MAC number between 5.8 and 7.2 when disposed in a polypropylene buffer tube at −40° C. with a length of 550 meters. Microbend becomes a greater issue at low temperatures due to mismatches in the coefficient of thermal expansion, for example between the buffer tube and the optical fiber. Point 353 is the measured induced attenuation at 1550 nm for an optical fiber having a MAC number of about 6.17 with known primary and secondary coatings equal to about 0.08 dB. Point 363 is the measured induced attenuation at 1625 nm for an optical fiber having a MAC number of about 6.17 with known primary and secondary coatings equal to about 0.15 dB. Although it was known that macrobend losses would be lower for lower MAC number fibers, we found that the microbend losses were unexpectedly dominant for lower MAC number fibers.

We have also surprisingly found that a certain combination of primary and secondary coatings remarkably improve microbend performance, and therefore overall bend performance, particularly in such fibers deployed in such manner.

Thus, the optical fiber disclosed herein comprises a primary coating P contacting and surrounding the outer annular cladding region 200, the primary coating P having a Young's modulus of less than 1.0 MPa, preferably less than 0.9 MPa, and in preferred embodiments not more than 0.8 MPa, and further comprises a secondary coating S contacting and surrounding the primary coating P, the secondary coating S having a Young's modulus of greater than 1200 MPa, and in preferred embodiments greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 μm) and 0.004" (102 μm) in thickness and about 1.3 cm in width, with a gauge length of 5.1 cm, and a test speed of 2.5 cm/min.

Primary coating P desirably has a glass transition temperature lower than the lowest projected use temperature of the coated optical fiber. In preferred embodiments, the primary coating P has a glass transition temperature of less than −25° C., more preferably less than −30° C. Primary coating P desirably has a higher refractive index than the cladding of the optical fiber in order to allow it to strip errant optical signals away from the core 100 of optical fiber 300. For example, a transmission optical fiber has refractive index values at a wavelength of 1550 nm for the core and cladding of 1.447 and 1.436, respectively; as such, it is desirable that the refractive index of primary coating P be greater than 1.44 at 1550 nm. The primary coating P should maintain adequate adhesion to the glass fiber during thermal and hydrolytic aging, yet be strippable therefrom for splicing purposes. The primary coating P typically has a thickness in the range of 25-50 μm (e.g., about 32.5 μm). The primary coating P can be applied to the optical fiber as a liquid and cured.

The primary coating P is preferably a cured product of a primary curable composition including an oligomer and at least one monomer. The primary curable compositions used in forming the primary coatings may also include photoinitiators, antioxidants, and other additives familiar to the skilled artisan. The total oligomer content of the primary curable composition is between about 5 wt % and about 95 wt %, preferably between about 25 wt % and about 75 wt %, and in certain preferred embodiments between about 40 wt % and about 60 wt %. The monomer component of the primary curable composition is generally selected to be compatible with the oligomer, to provide a low viscosity formulation, and to increase the refractive index of the primary coating. The total monomer content of the primary curable composition is between about 5 wt % and about 95 wt %, preferably between about 25 wt % and about 65 wt %, and in certain preferred embodiments of the invention, between about 35 wt % and about 55 wt %.

In a preferred embodiment, the primary coating P comprises 52 wt % BR 3741, (oligomer) available from Bomar Specialty Co., 41.5 wt % Photomer 4003 (monomer) available from Cognis, 5 wt % Tone M-100 (monomer) available from Dow Chemical, 1.5 wt % Irgacure 819 (photoinitiator) available from Ciba Specialty Chemical, 1 pph (3-Acryloxypropyl)trimethoxysilane (adhersion promoter) available from Gelest Incorporated, 1 pph Irganox 1035 (antioxidant) available from Ciba, and 0.03 pph Pentaerythritol tetrakis (3-mercaptoproprionate) (stability additive) available from Aldrich. This preferred embodiment of the primary coating has a Young's modulus of about 1500 MPa and a glass transition temperature (Tg) of about 55° C.

The secondary coating S is formed from a cured polymeric material, and typically has a thickness in the range of 20-35 μm (e.g., about 27.5 μm). The secondary coating S desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating). While in FIG. 8, the secondary coating S is shown as having been applied directly to the primary coating, the skilled artisan will recognize that one or more intermediate coating layers may be deposited between the primary coating P and the secondary coating S. The secondary coating S of the coated optical fiber 300 is preferably formed from a cured polymeric material having a ductility of at least about 275 μm. The cured polymeric materials used in the secondary coatings of the optical fibers of the present invention are preferably the cured product of a secondary curable composition including an oligomer and at least one monomer. The oligomer of the curable composition is selected to provide a high ductility and a high Young's modulus to the cured polymeric material. The secondary curable compositions also include one or more monomers having reactive termini selected to react with the reactive termini of the oligomer. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

In a preferred embodiment, the secondary coating S comprises 10 wt % KWS 4131 (oligomer) available from Bomar Specialty Co., 82 wt % Photomer 4028 (monomer) available from Cognis, 5 wt % Photomer 3016 (monomer) available from Cognis, 1.5 wt % Lucerin TPO (photoinitiator) available from BASF, 1.5 wt % Irgacure 184 (photoinitiator) available from Ciba Specialty Chemical (Hawthorne, N.Y.), 0.5 pph Irganox 1035 (antioxidant) available from Ciba. This preferred embodiment of the secondary coating has a Young's modulus of about 1500 MPa and a glass transition temperature (Tg) of about 55° C.

Additional description of suitable primary and secondary coatings can be found in PCT Publication WO2005/010589 which is incorporated herein by reference in its entirety.

Point 354 in FIG. 9 shows the measured induced attenuation at 1550 nm for an optical fiber having a MAC number of about 6.07 with the preferred embodiment primary coating and preferred embodiment secondary coating described herein, wherein the induced attenuation of the point 354 fiber was equal to about 0.0008 dB. Point 364 in FIG. 9 shows the measured induced attenuation at 1625 nm for an optical fiber having a MAC number of about 6.07 with the preferred embodiment primary coating and preferred embodiment secondary coating described herein, the attenuation of point 364 equal to about 0.01 dB. Thus, the overall bending induced attenuation was reduced from about 0.08 dB for point 353 fiber to about 0.0008 dB for point 354 fiber at 1550 nm and from about 0.15 dB for point 363 fiber to about 0.01 dB for point 364 fiber at 1625 nm for optical fiber of MAC number around 6.2, wherein the microbend loss component was greatly reduced. These results are not restricted to deployment in polypropylene buffer tubes, but also apply to other materials, such as high density polyethylene.

Preferably, the optical fibers disclosed herein have a low OH content, and preferably have an attenuation curve which exhibits a relatively low, or no, water peak in a particular wavelength region, especially in the E-band. Methods of producing low water peak optical fiber can be found in PCT Application Publication Numbers WO00 /64825, WO 01/47822, and WO02/051761, the contents of each being hereby incorporated by reference. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nmn would tend to decrease the pump attenuation and increase the pump efficiency, e.g. gain per mW of pump power, especially for pump wavelengths around 1400 nm.

The fibers disclosed herein exhibit low PMD values particulary when fabricated with OVD processes. Spinning of the optical fiber may also lower PMD values for the fiber disclosed herein.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
   a core region having a refractive index profile;
   an outermost annular cladding region surrounding the core region;
   a primary coating contacting and surrounding the outer annular cladding region, the primary coating having a Young's modulus of less than 1.0 MPa and a glass transition temperature of less than −25° C.;
   a secondary coating surrounding the primary coating, the secondary coating having a Young's modulus of greater than 1200 MPa;
   wherein the refractive index profile is selected to provide a MAC number of not more than 7.0, a zero dispersion wavelength of less than 1450 nm, and a 20 mm diameter bend loss at 1550 nm of not more than 5.0 dB/m.

2. The optical fiber of claim 1 wherein the primary coating is a cured product of a primary curable composition including an oligomer and at least one monomer.

3. The optical fiber of claim 2 wherein the total oligomer content of the primary curable composition is between about 40 wt % and about 60 wt %.

4. The optical fiber of claim 2 wherein the total monomer content of the primary curable composition is between about 35 wt % and about 55 wt %.

5. The optical fiber of claim 1 wherein the 20 mm diameter bend loss at 1550 nm is not more than 2.0 dB/m.

6. The optical fiber of claim 1 wherein the refractive index profile is selected to further provide a 2-m fiber cutoff of less than 1400 nm.

7. The optical fiber of claim 1 wherein the refractive index profile is selected to further provide a 2-m fiber cutoff of less than 1330 nm.

8. The optical fiber of claim 1 wherein the refractive index profile is selected to further provide a zero dispersion wavelength of less than 1325 nm.

9. The optical fiber of claim 1 wherein the refractive index profile is selected to further provide a zero dispersion wavelength of between 1300 and 1325 nm.

10. The optical fiber of claim 1 wherein the refractive index profile is selected to further provide a cabled cutoff of less than 1260 nm.

11. The optical fiber of claim 1, wherein the refractive index profile is selected to further provide a mode field diameter at 1310 nm of less than 9.0 μm.

12. The optical fiber of claim 1 wherein the refractive index profile is selected to further provide a mode field diameter at 1310 nm of between 8.2 and 9.0 μm.

13. The optical fiber of claim 1 wherein the refractive index profile is selected to further provide a mode field diameter at 1310 nm of not more than 8.6 μm.

14. The optical fiber of claim 1 wherein the refractive index profile is selected to further provide a MAC number of between 6.2 and 7.0.

15. The optical fiber of claim 1 wherein the relative refractive index profile of the core relative to the outermost annular cladding region is non-negative.

16. The optical fiber of claim 1 wherein the optical fiber has a maximum hydrogen induced attenuation change of less than 0.03 dB/km at 1383 nm after being subjected to 0.01 atm partial pressure hydrogen for at least 144 hours.

17. The optical fiber of claim 1 wherein the optical fiber has an optical attenuation at 1383 nm which is not more than 0.10 dB/km above an optical attenuation at 1310 nm.

18. The optical fiber of claim 1 wherein the 20 mm diameter bend loss at 1550 nm is not more than 0.05 dB/m.

19. An optical fiber ribbon comprising the optical fiber of claim 1.

20. An optical fiber cable comprising the optical fiber of claim 1.

* * * * *